United States Patent
Lamb

(10) Patent No.: US 11,660,737 B2
(45) Date of Patent: May 30, 2023

(54) DIRECTIONAL CLINCHING TOOL AND NAILS

(71) Applicant: PNEUTOOLS, INC., Arlington, TN (US)

(72) Inventor: Frederick William Lamb, McDonald, PA (US)

(73) Assignee: PneuTools, Inc., Arlington, TN (US)

( * ) Notice: Subject to any disclaimer, the term of this patent is extended or adjusted under 35 U.S.C. 154(b) by 0 days.

(21) Appl. No.: 17/016,745

(22) Filed: Sep. 10, 2020

(65) Prior Publication Data

US 2021/0069882 A1 Mar. 11, 2021

Related U.S. Application Data

(60) Provisional application No. 62/898,147, filed on Sep. 10, 2019.

(51) Int. Cl.
| | | |
|---|---|---|
| *B25C 7/00* | (2006.01) | |
| *B25C 1/00* | (2006.01) | |
| *F16B 15/08* | (2006.01) | |
| *B27F 7/09* | (2006.01) | |
| *B27F 7/04* | (2006.01) | |

(52) U.S. Cl.
CPC ............... *B25C 7/00* (2013.01); *B25C 1/003* (2013.01); *B27F 7/04* (2013.01); *B27F 7/09* (2013.01); *F16B 15/08* (2013.01)

(58) Field of Classification Search
CPC .................................. B25C 7/00; B25C 1/003
See application file for complete search history.

(56) References Cited

U.S. PATENT DOCUMENTS

| | | | | | |
|---|---|---|---|---|---|
| 2,279,584 | A | * | 4/1942 | Vogel | B25C 5/1613 227/126 |
| 2,311,412 | A | * | 2/1943 | Pankonin | B25C 5/1617 227/126 |
| 2,316,988 | A | * | 4/1943 | Schmidtke | B27F 7/26 227/124 |
| 2,343,203 | A | * | 2/1944 | Pankonin | B25C 5/0285 227/125 |
| 2,376,936 | A | * | 5/1945 | Pfeffer | F16B 15/04 411/922 |

(Continued)

OTHER PUBLICATIONS

International Search Report and Written Opinion for corresponding International Application No. PCT/US20/27956 dated Jul. 24, 2020.

(Continued)

*Primary Examiner* — Thomas M Wittenschlaeger
*Assistant Examiner* — Katie L Gerth
(74) *Attorney, Agent, or Firm* — Reed Smith LLP

(57) ABSTRACT

A clinch nailer tool system. The system includes a clinch nailer tool body, coil magazine disposed in a bottom of the clinch nailer tool body and configured to hold a coil of nails, clinch arm pivotally connected to the clinch nailer tool body at a proximal end of the clinch arm, clinch nailer tool nose disposed in a front portion of the clinch nailer tool body, wherein the clinch nailer tool nose includes an opening in a lower portion thereof for receiving a nail from the coil magazine; and clinch plate disposed on a distal end of the clinch arm, wherein the clinch plate is configured to bend a nail from the clinch nailer tool nose.

10 Claims, 5 Drawing Sheets

(56) References Cited

U.S. PATENT DOCUMENTS

| | | | | |
|---|---|---|---|---|
| 2,687,522 | A * | 8/1954 | Juilfs | B25C 5/13 227/124 |
| 2,772,415 | A * | 12/1956 | Jenny | B25C 5/1665 227/124 |
| 2,898,964 | A * | 8/1959 | Albertt | F16B 19/14 411/968 |
| 2,943,327 | A * | 7/1960 | Juilfs | B25C 5/13 227/130 |
| 3,734,378 | A * | 5/1973 | Rice | B25C 5/0292 227/124 |
| 3,900,144 | A * | 8/1975 | Hamilton | B25C 7/00 227/155 |
| 4,011,785 | A * | 3/1977 | Schrepferman | B25C 1/005 411/545 |
| 4,459,912 | A * | 7/1984 | Barbour | B41L 19/00 101/269 |
| 4,460,301 | A * | 7/1984 | Wahlstrom | F16B 15/04 411/501 |
| 4,623,084 | A * | 11/1986 | Olesen | B32B 38/12 227/153 |
| 4,726,504 | A * | 2/1988 | Halbert | B21J 15/10 227/130 |
| 5,056,976 | A * | 10/1991 | Sygnator | F16B 15/02 411/442 |
| 6,203,482 | B1 * | 3/2001 | Sandford | B26D 5/02 493/355 |
| 6,237,827 | B1 * | 5/2001 | Reckelhoff | B25C 5/0292 227/130 |
| 6,419,253 | B1 * | 7/2002 | Mascari | A61G 5/1059 280/250.1 |
| 6,431,428 | B1 * | 8/2002 | Chen | B25C 1/00 227/119 |
| 7,374,384 | B2 * | 5/2008 | Sutt, Jr. | F16B 15/06 411/422 |
| 7,556,183 | B1 * | 7/2009 | Liang | B25C 1/008 227/112 |
| 9,993,913 | B2 * | 6/2018 | McCardle | B25C 7/00 |
| 10,611,009 | B2 * | 4/2020 | Huang | B25C 1/008 |
| 2004/0031839 | A1 * | 2/2004 | Pruyne | E04G 21/122 227/130 |
| 2006/0071047 | A1 * | 4/2006 | Aguirre | B25C 1/047 227/119 |
| 2006/0266787 | A1 * | 11/2006 | Ura | B25C 5/0228 227/131 |
| 2009/0159633 | A1 * | 6/2009 | Wu | B25C 1/008 227/8 |
| 2014/0076954 | A1 | 3/2014 | Miller et al. | |
| 2014/0209657 | A1 * | 7/2014 | Huang | B25C 7/00 227/19 |
| 2017/0297188 | A1 * | 10/2017 | Huang | B25C 7/00 |
| 2017/0368672 | A1 * | 12/2017 | Meyer | B25C 7/00 |
| 2018/0354112 | A1 | 12/2018 | Huang et al. | |
| 2020/0230792 | A1 * | 7/2020 | Lamb | B25C 5/0207 |

OTHER PUBLICATIONS

International Search Report and Written Opinion for corresponding International Application No. PCT/US20/20091 dated Nov. 27, 2020.

"Polyamide Fibers (Nylon)" (Polymer Properties Database(online)(retrieved from the internet on Jun. 11, 2020: https://web.archive.org/web/20170311172258/https://polymerdatabase.com/Fibers/Nylon.html.Mar. 11, 2017; entire document, especially paragraph 3.

* cited by examiner

DIRECTIONAL CLINCHING TOOL AND NAILS

CROSS REFERENCE RELATED APPLICATION

This application claims the benefit under 35 U.S.C. § 119(e) of the earlier filing date of U.S. Provisional Patent Application No. 62/898,147 filed on Sep. 10, 2019, the disclosure of which is incorporated by reference herein.

BACKGROUND

Exemplary embodiments disclosed herein relate to pneumatic coil nailers, and in particular, to pneumatic clinching nailer mechanisms and nail nails for clinching pallet nails into pallet boards. Clinch nails are typically used to fasten two pieces of wood together. For example, a pallet may be formed from wood pieces (deck boards and stringers) fastened together by clinch nails where they intersect.

A pneumatic clinching nailer is typically a pallet coil nailer mounted to a mechanical clinching system with a tool base, clinching arm, and clinch plate on that arm. Nails are placed in a coil magazine, which holds and positions a coil of nails at the top of the inside of the nose of the tool. When the pallet coil nailer is fired, a piston driver cycles down one stroke, shearing the nail from its collated and held position from the top of the inside of the nose, driving the nail down through the inside chamber of the nose, down to the top surface of wood piece of the pallet, down through the wood pieces, into a metal clinch plate on the bottom, and the nail point is intended to ricochet off of the metal clinch plate and back up into bottom of the wood piece of the pallet, thereby clinching the wood pieces together.

Clinch nails typically have a cut point on the tip of the nail that has longer cuts to two sides of the nail tip, and either a shallow cut or no cut on the other side of the nail tip. The nails that are cut with this kind of tip are then collated with their cut tip oriented in a random fashion on the spooled coil of nails. When nails such as these are fired through the wood pieces and into the metal clinch plate, the nail tip fails in a random direction according to the nail tip cut, causing the clinch to start moving in the random direction that the tip has failed in. The clinch nails with these cut tips are collated in a random direction. This means that the direction of the clinch that is attained is completely random. The nails being fired from the top of the nose in the coil pallet nailer means that the nail rotates and moves in multiple random ways inside of the nose of the tool as it travels downward through the inside of the nose into the work surface. This random clinching direction means that many times the clinch nail will run parallel to the grain of the wood it is being fired into, thereby reducing the effectiveness of the clinch, as it has much less holding power than when it is clinched across the grain of the wood.

Pneumatic clinch tools are disclosed in commonly invented and assigned U.S. patent application Ser. No. 16/747,648, filed Jan. 18, 2019; Ser. No. 16/847,161, filed Apr. 13, 2020 the disclosures of which are incorporated by reference herein.

BRIEF DESCRIPTION OF THE DRAWINGS

Various embodiments of the disclosure are described herein in by way of example in conjunction with the following figures, wherein like reference characters designate the same or similar elements.

DETAILED DESCRIPTION

Figure 1:
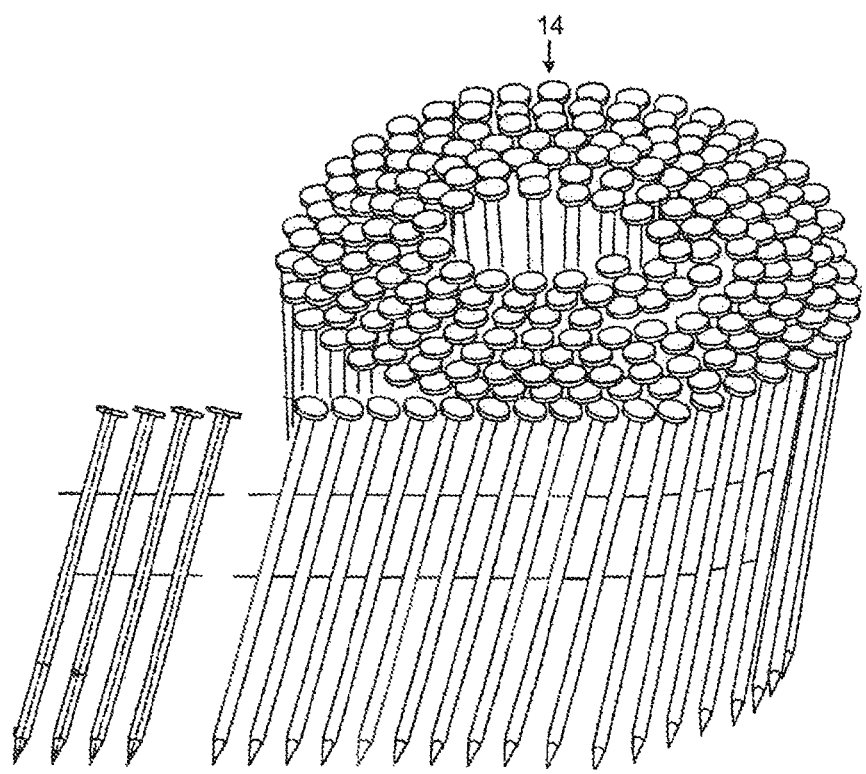
FIG. 1 is a perspective view of a coil of nails.
Figure 2:
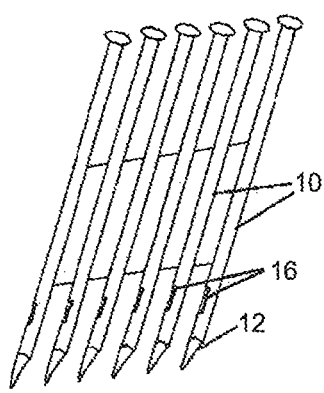
FIG. 2 is a front view of nails according to a first exemplary embodiment.

Referring to FIGS. 1-8, exemplary embodiments disclosed herein relate to a clinch nailer and clinch nails that consistently clinch the nails in one direction across the grain of the wood. This significantly increases the life of the pallet in service, and the specific designs of the tool and nails also increase the life of the clinch nailer during use, as the exemplary embodiments reduce fatigue on the tool.

The clinch direction is consistently achieved by several factors. First, the nail itself has one of several different designs that help it clinch more easily. Three exemplary embodiments of the nail are disclosed herein and shown in FIGS. 2-4 that help increase the clinching of the nail during operation. In a first exemplary embodiment shown in FIG. 2, a nail 10 having a nail tip 12 includes a stamped deformity 16 on one particular side of the nail 10. The nail 10 is then collated with the deformity 16 facing the same direction as the other nails 10 disposed along a coil of nails such as a coil 14 shown in FIG. 1. This allows the nail 10 to clinch in the same direction every time, as the deformity 16 stamped in the nail 12 allows the material of the nail to fail in the same direction every time, thereby causing the nail 10 to clinch in the same way every time.

Figure 3:
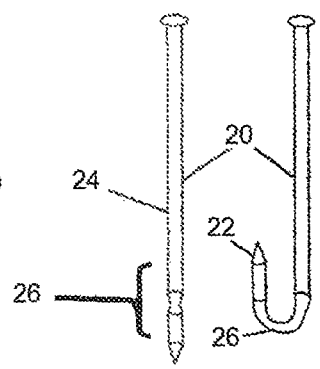
FIG. 3 is a front view of nails according to a second exemplary embodiment.

In a second exemplary embodiment shown in FIG. 3, a nail 20 with a single deep groove or ring 26 stamped into the bend zone of the shank 24 creates an area for the nail 20 to fail consistently, as it is the weaker zone of the nail. This single ring 26 stamped into the shank 24 of the nail 20 fails as the tip 22 of the nail 20 is driven into a clinch plate 104 of the cinch nailer 100 as discussed below.

Figure 4:
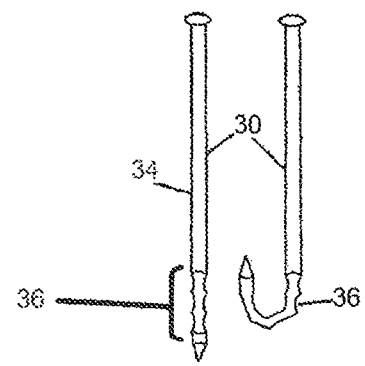
FIG. 4 is a front view of nails according to a third exemplary embodiment.
Figure 5:
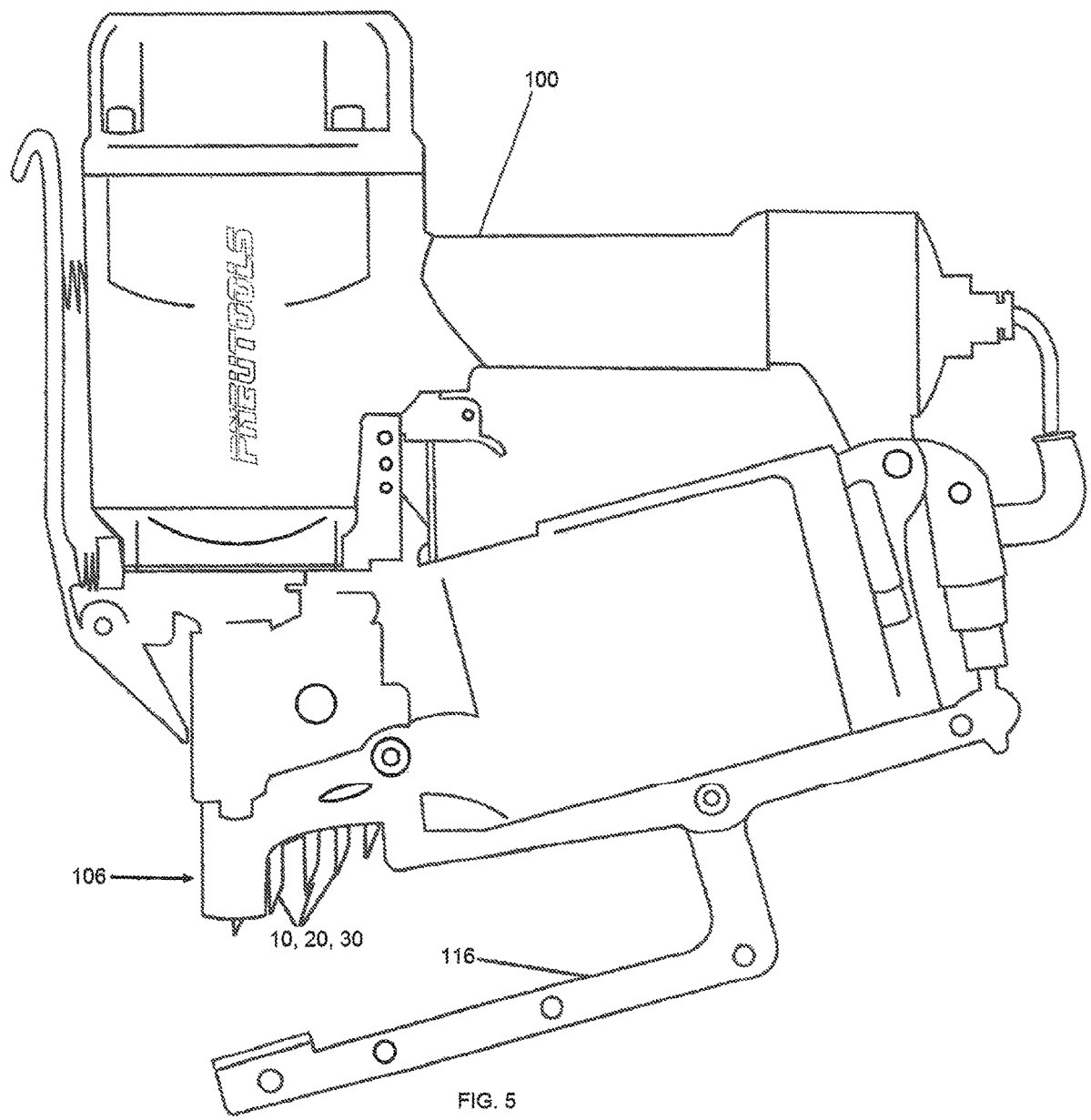
FIG. 5 is a side view of a clinch nailer according to an exemplary embodiment.
Figure 6:
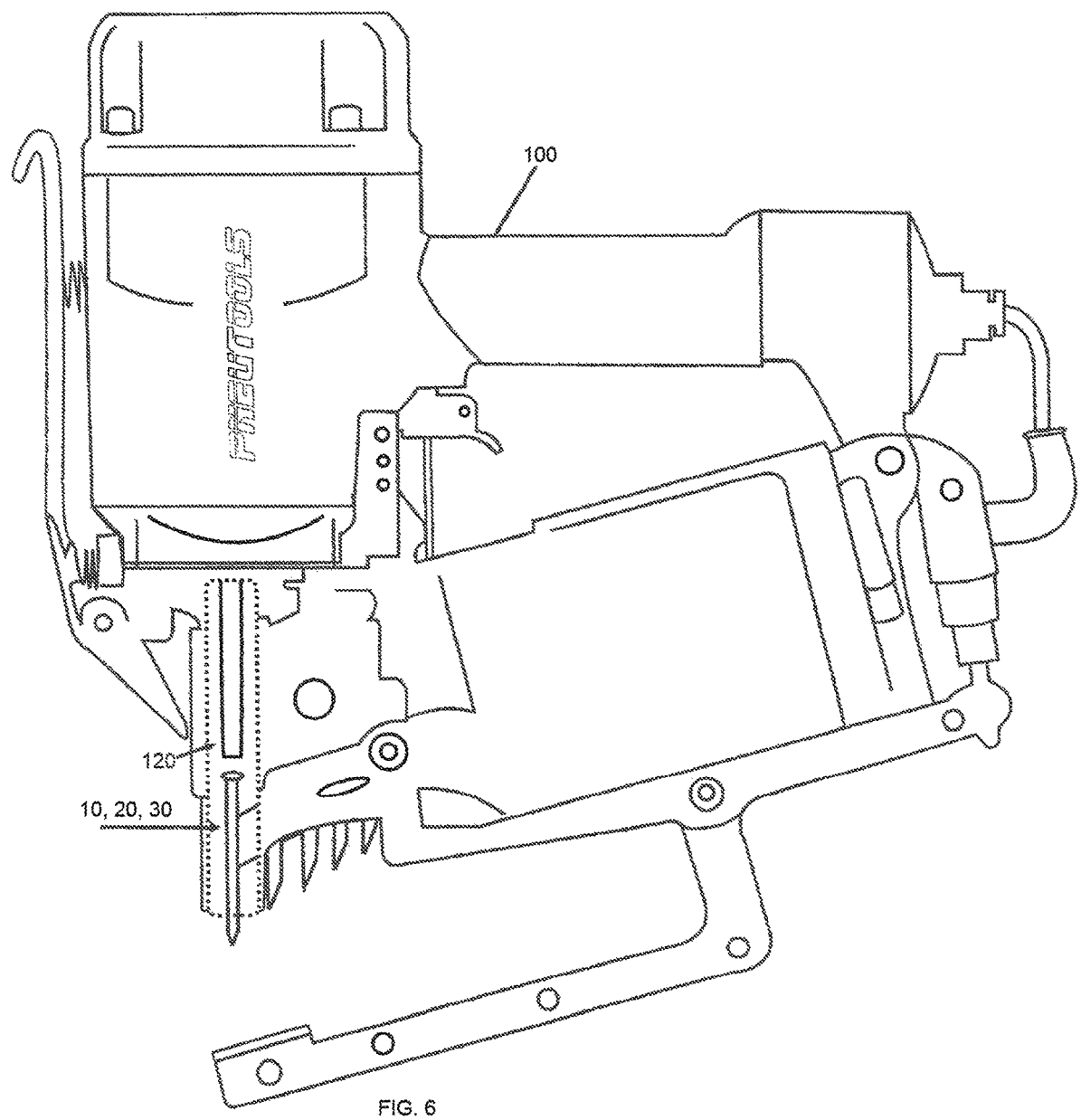
FIG. 6 is a side view of a clinch nailer according to an exemplary embodiment.
Figure 7:
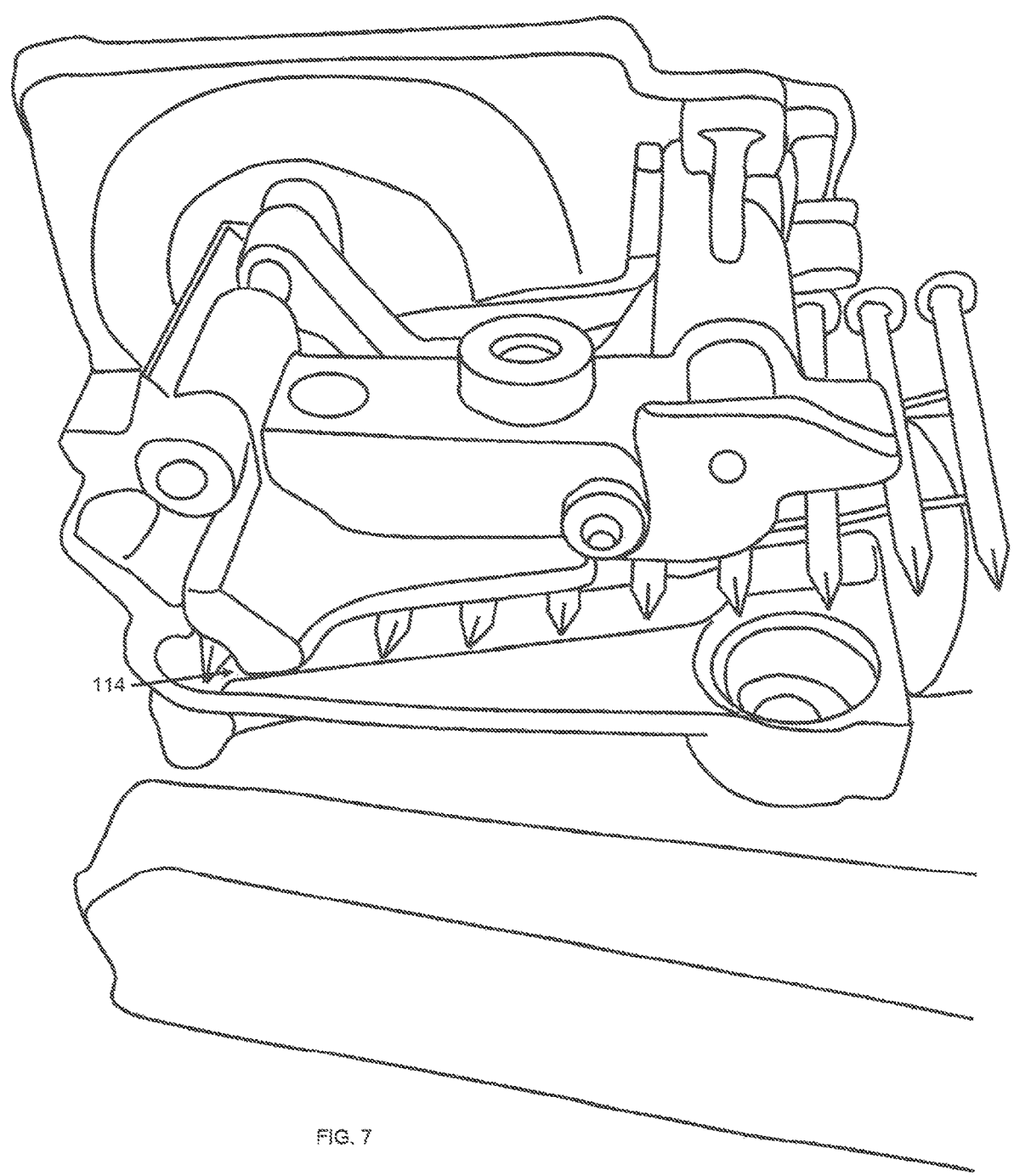
FIG. 7 is a partial perspective view of the interior of the clinch nailer according to an exemplary embodiment.
Figure 8:
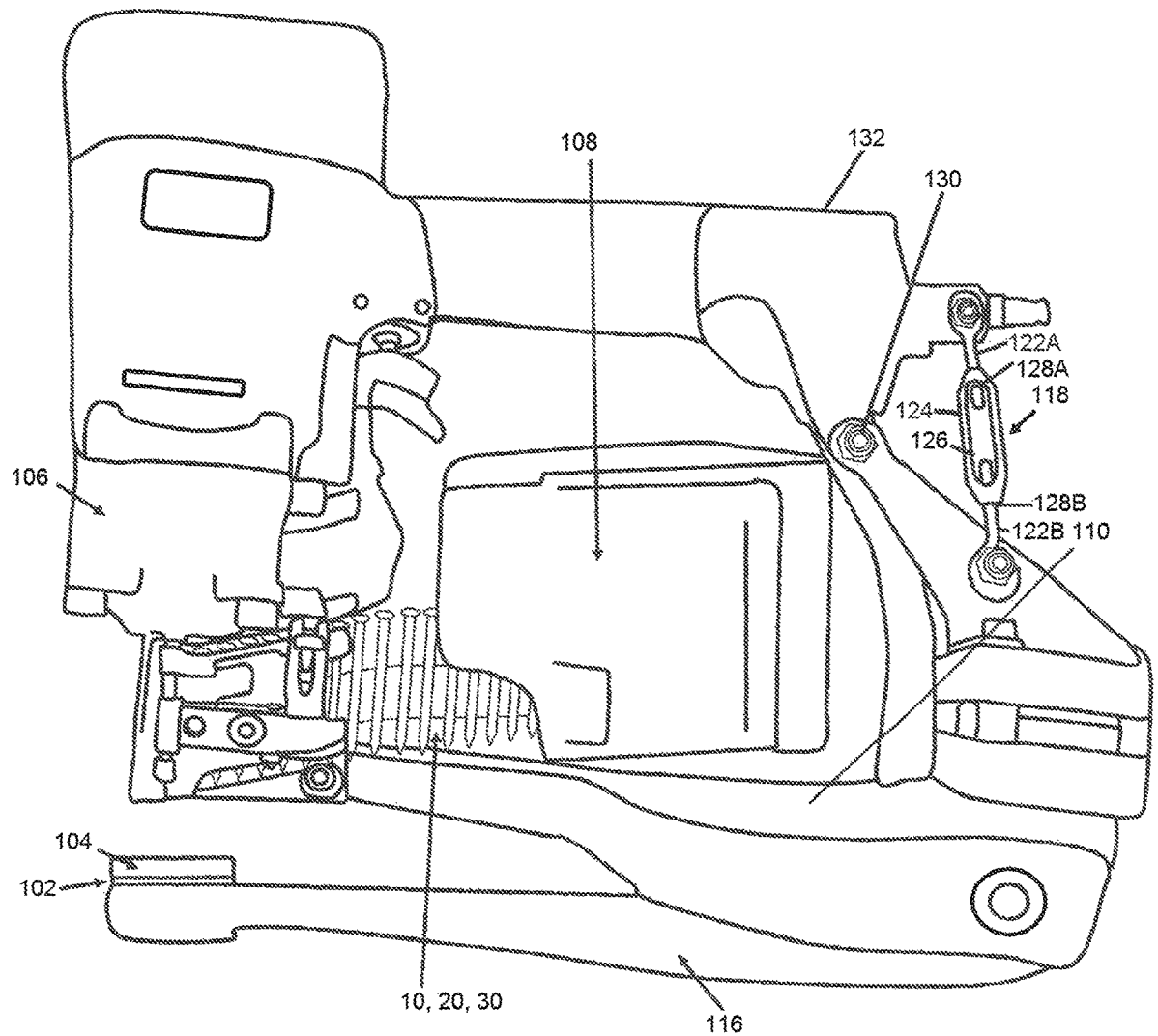
FIG. 8 is a partial side view of the interior of the clinch nailer according to an exemplary embodiment.

In a third exemplary embodiment shown in FIG. 4, a nail 30 with multiple deep rings 36 disposed along the bend zone of the shank 34 of nail 30 assist in accomplishing the same thing as a single deep ring being stamped in the shank, except that it allows the nail 30 to curl and form a clinch even more easily along the bend zone.

The exemplary embodiments utilizing rings in the bend zone shown in FIGS. 3 and 4 increase the ease of manufacturing the nails 20, 30, as it does not require needing to orient the nail 20, 30 in a specific direction for controlling the clinch direction of the nail. However, this bend zone ring design causes the nail 20, 30 to once again clinch in a random direction if fired from a typical clinch nailer.

To allow for the ease of manufacturing the bend zone ring design nails, and yet still consistently control the direction of the clinch nail, a pneumatic clinch nailer tool according to an exemplary embodiment is configured to allow for this to be accomplished.

Exemplary embodiments provide for the placement and position of certain specialized clinch nails 10, 20, 30 inside the nose of a pneumatic clinch nailer tool 100, the design and function of the specialized clinch nails 10, 20, 30, and a resilient or rubber pad 102 under the clinch plate 104 that increases the rate of clinching.

First, the nails 10, 20, 30 are disposed and held in the bottom of the clinch nailer tool's nose 106 and magazine 108. Placing the nails 10, 20, 30 in the bottom of the nose 106 instead of the top increases accurate placement of the nail 10, 20, 30 into the work material. To accomplish this, an extended nose 106 has been attached to the forward end of the clinch nailer tool body 110, and an opening 114 has been placed into the back side of the nose 106 at a bottom portion thereof to allow the passage of the nails 10, 20, 30 through the nose 106 from the magazine 108. The magazine 108 of the clinch nailer tool 106 has also been lowered to accommodate the lowered nails 10, 20, 30 and is disposed in the bottom of the clinch nailer tool body 110.

Secondly, a rubber plate 102 has been placed directly underneath of the steel clinch plate 104 attached to the distal end of a clinch arm 116 pivotally attached to the tool body 110. This accomplishes several things. First, it increases the life of the steel clinch plate 104, and the clinch arm 116 of the clinch nailer tool 100. Second, it assists in the clinching of the nail 10, 20, 30. As the nail 10, 20, 30 is driven into the clinch plate 104, the rubber plate 102 fails in a particular direction as the force of the nail 10, 20, 30 causes it to crush slightly in the direction of the pressure being applied. The crushing of the rubber plate 102 causes the steel clinch plate 104 to angle slightly in that direction. The angling of the steel clinch plate 104 causes the nail 10, 20, 30 to run in that direction for the purpose of the clinch. The push back of the crushed rubber plate 102 sends force back against the pressure of the nail 10, 20, 30, causing it to clinch even more easily, as it is driven back up through the bottom of the work surface to finish creating the clinch.

Lastly, the clinch nailer tool 100 has an angle adjustment mechanism 118 on the back of the clinch nailer tool 100. The angle adjustment mechanism 118 includes two oppositely disposed bolts 122A, 122B in a threaded tensioner 124. The threaded tensioner 124 may be oblong in shape and has an oval opening 126 on at least one sidewall thereof. Threaded tensioner 124 has internally threaded openings 128A, 128B disposed in each end thereof. Threaded portions of bolts 122A, 122B are received in the internally threaded openings 128A, 128B which are threaded in opposite directions. The head portion of bolt 122A is attached to the tool housing 132 and the head portion of bolt 122B is attached to the clinch mechanism which includes clinch arm 116. To adjust the angle of the clinch nailer tool 100, a user rotates threaded tensioner 124 about its longitudinal axis, which in turns causes the bolts 122A and 122B to move either closer or farther apart within threaded tensioner 124 causing the tool housing 132 to rotate up or down by pivoting around a bolt 130 connected to the back of the housing 132 and acting as the angle adjustment mechanism 118 rotation point. This allows the user to adjust the angle of the clinch nailer tool 100. This change effects the angle of the nail 10, 20, 30 being shot into the clinch plate 104. The angle the nail 10, 20, 30 is at when it strikes the clinch plate 104 determines the direction of the clinch greatly. When combined with the bend zone ring design on the nail 20, 30, it causes the nail 20, 30 to always clinch in the direction the user has established the angle at. This angling of the clinch nailer tool 100 and nails 20, 30 also reduces the force being applied to the clinch arm 116 and clinch plate 104 and driver blade 120, which increases the life of the clinch nailer tool 100 and the parts while being used.

This combination of nail and tool designs allows for a controllable and consistent clinching direction of the nails, thereby increasing the life of the work piece greatly. It decreases the complexity and costs of the clinch nails. It also increases the life of the tool being used by reducing fatigue on the parts of the tool receiving the highest amount of force.

Many alternatives, modifications, and variations are enabled by the present disclosure. While specific embodiments have been shown and described in detail to illustrate the application of the principles of the invention, it will be understood that the exemplary embodiments may be embodied otherwise without departing from such principles. Accordingly, Applicants intend to embrace all such alternatives, modifications, equivalents, and variations that are within the spirit and scope of the exemplary embodiments.

What is claimed is:

1. A clinch nailer tool system comprising:
   a clinch nailer tool body:
   a coil magazine disposed in a bottom of the clinch nailer tool body and configured to hold a coil of nails;
   a clinch arm pivotally connected to the clinch nailer tool body at a proximal end of the clinch arm;
   a clinch nailer tool nose disposed in a front portion of the clinch nailer tool body, wherein the clinch nailer tool nose includes an opening in a lower portion thereof for receiving a nail from the coil magazine;
   a clinch plate disposed on a distal end of the clinch arm, wherein the clinch plate is configured to bend the nail from the clinch nailer tool nose; and
   an adjustment mechanism configured to adjust the angle of the clinch nailer tool; wherein a first portion of the adjustment mechanism is attached to a tool housing of the tool body and a second portion of the adjustment mechanism is attached to a clinch mechanism which includes the clinch arm, wherein the angle adjustment mechanism is configured to adjust the angle of the clinch nailer tool body with respect to the clinch arm;
   wherein the adjustment mechanism comprises two oppositely disposed bolts in a threaded tensioner.

2. The clinch nailer tool system of claim 1, further comprising:
   a resilient pad disposed between the clinch arm and the clinch plate configured to angle the clinch plate when the tool nose is depressed.

3. The clinch nailer tool system of claim 1, wherein the threaded tensioner has internally threaded openings disposed in each end thereof, and wherein threaded portion of the bolts are disposed in the threaded openings.

4. The clinch nailer tool system of claim 3, wherein the internally threaded openings are threaded in opposite directions.

5. The clinch nailer tool system of claim 4, wherein the first portion of the adjustment mechanism comprises a head portion of a first one of the bolts attached to the tool housing of the tool body and the second portion of the adjustment mechanism comprises a head portion of a second one of the bolts attached to the clinch mechanism, wherein the angle adjustment mechanism is configured to adjust the angle of the clinch nailer tool when a user rotates the threaded tensioner about a longitudinal axis.

6. The clinch nailer tool system of claim 5, wherein the pair of bolts are configured to move relative to one another within the threaded tensioner causing the tool housing to rotate up or down by pivoting around an angle adjustment mechanism rotation point.

7. The clinch nailer tool system of claim 1,
wherein each of the nails comprises a first end comprising a tip, a second end opposite the tip, and a shank disposed between the first end and the second end; wherein the shank comprises a bend zone disposed closer to the first end than the second end; and further comprising at least one deformity in the bend zone configured to allow the nail to bend at the bend zone when the nail is driven into the clinch plate.

8. The clinch nailer tool system of claim 7, further comprising the coil of nails, wherein each of the nails has the deformity on one side of the nail.

9. The clinch nailer tool system of claim 7, further comprising the coil of nails, wherein the at least one deformity comprises a ring groove disposed in the shank of the nail.

10. The clinch nailer tool system of claim 9, wherein the at least one deformity comprises a plurality of ring grooves disposed in the shank of the nail.

* * * * *